United States Patent
Ono

(10) Patent No.: US 7,689,808 B2
(45) Date of Patent: Mar. 30, 2010

(54) DATA PROCESSOR AND DATA PROCESS METHOD

(75) Inventor: Akihisa Ono, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 352 days.

(21) Appl. No.: 11/790,156

(22) Filed: Apr. 24, 2007

(65) Prior Publication Data

US 2007/0255932 A1 Nov. 1, 2007

(30) Foreign Application Priority Data

Apr. 26, 2006 (JP) .............................. 2006-121512

(51) Int. Cl.
*G06F 9/315* (2006.01)
(52) U.S. Cl. ....................................................... 712/10
(58) Field of Classification Search ........................ None
See application file for complete search history.

(56) References Cited

U.S. PATENT DOCUMENTS 6,009,230 A * 12/1999 Shimoda et al. ............... 386/68
7,162,080 B2 * 1/2007 Chui et al. .................. 382/168
2005/0141861 A1 * 6/2005 Dunbar et al. ................ 386/68

FOREIGN PATENT DOCUMENTS

| JP | 2-25139 | 1/1990 |
|----|---------|--------|
| JP | 6-152888 | 5/1994 |
| JP | 11-261424 | 9/1999 |

* cited by examiner

*Primary Examiner*—Eric Coleman
(74) *Attorney, Agent, or Firm*—Young & Thompson

(57) ABSTRACT

A data processor includes a reader for reading a bit stream stored in a storage if there is free space of 8 bits or more in a buffer and outputting to a first array changer, the first array changer for changing an array sequence of the 8 bits in reversed sequence for a PNG bit stream but does not change the array sequence for a JPEG bit stream, a second array changer for further changing the array sequence of the 8 bits to output in case of PNG but outputting as it is in case of JPEG when reading out fixed length data of 8 bits from the buffer to the second processor, and a first processor for reading bits of VLC by 10 bits each from the buffer.

9 Claims, 14 Drawing Sheets

DATA PROCESSOR AND DATA PROCESS METHOD

BACKGROUND OF THE INVENTION

1. Field of the Invention

The present invention relates to a data processor and, in particular, to a technique for commonly processing bit streams of different bit array sequences.

2. Description of the Related Art

Digital image data has come to be regularly used in recent years. Due to the demand for saving capacity in a storage medium to store image data and reducing time to transmit image data, image data is usually compressed by an encoding at a time of transmission and storage, and decoded when reproduced.

As a compression standard of image data, JPEG (Joint Photographic Experts Group) is well known. An image format based on JPEG is widely used in Web pages, digital cameras and DVDs (Digital Versatile Disk).

To reproduce JPEG compressed data, a bit stream, which is compressed data, is read out from a storage medium to retrieve a Huffman code therefrom. The retrieved Huffman code is input to a decoder and decoded by the decoder (see Japanese Unexamined Patent Application Publication No. Hei-11-261424).

FIG. 13 is a view showing a JPEG format. As shown in FIG. 13, a JPEG stream is formed by a plurality of 8 bits bit blocks, with one or more 8 bits fixed length data bit blocks included at the beginning followed by a bit block of variable length (VLC) part. The number of the bit blocks in the VLC part is one or more corresponding to the code length of the VLC. At the end of the last bit block in the VLC part, a padding bit is included, which is an invalid bit inserted to align the beginning of the fixed length data bit block that follows the variable length data to 8 bits boundary of the stream. The number of the padding bits is 0 to 7.

Other than the JPEG format, PNG (Portable Network Graphics) has come to be widely used in recent years. The structure of PNG is quite similar to the JPEG format shown in FIG. 13.

These two kinds of the image formats are employed to HD DVD (High Definition DVD) and Blue-ray Disc, which are the standards for next generation DVD, and the standards allow both formats to be combined.

With such background, a reproducing apparatus that supports both JPEG and PNG image formats is required. In such reproducing apparatus, in light of similarities between JPEG and PNG formats, it is desired to reduce the size of the reproducing apparatus and to reduce the manufacturing cost by reproducing images of both JPEG and PNG formats by a single reproducing apparatus.

For example as with the VLC part in the JPEG bit stream, a VLC part of PNG is also a Huffman code, thus the encoding method for the VLC part of PNG and that of JPEG is basically the same. Therefore, an apparatus for commonly processing the VLC parts in JPEG and PNG bit stream can be considered.

By the way as shown in FIG. 14, bit sequences in the blocks of 8 bits fixed length data of the JPEG and PNG bit streams are the same, however the bit sequences in the VLC blocks are different.

Therefore, to joint apparatuses for processing the VLC parts in the bit streams of JPEG and PNG, the bit array sequences of both the VLC blocks need to be aligned before being input to a VLC processor. However, it has now been discovered that to achieve this, a control for reading out a bit stream becomes complicated.

SUMMARY OF THE INVENTION

According to an aspect of the present invention, there is provided a data processor that includes a first array changer to change an array sequence of bits in reversed sequence for each bit block for a bit stream, the bit stream formed with a plurality of the bit blocks, a buffer to temporarily store the bit block with bit array sequence being changed by the first array changer, and a first processor to read bits included in a bit block to be processed by the first processor by each number of bits, a predetermined processing unit, in an array sequence of the buffer.

The "bit block" refers to a basic constitutional unit of a bit stream. Depending on the standard through, for JPEG or PNG, a bit stream is formed by 8 bits of bit blocks.

Note that the above apparatus that is replaced by a method, a system or a program is effective as an embodiment of the present invention.

According to the data processor of the present invention, it is possible to commonly use the apparatus for processing bit streams having different bit array sequences and also simplify the data supply to the processing apparatus.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Before explaining specific embodiments of the present invention, the principle of the data process technique according to the present invention is described hereinafter in detail with a data processing system 100 of FIG. 1 as an example.

Figure 1:
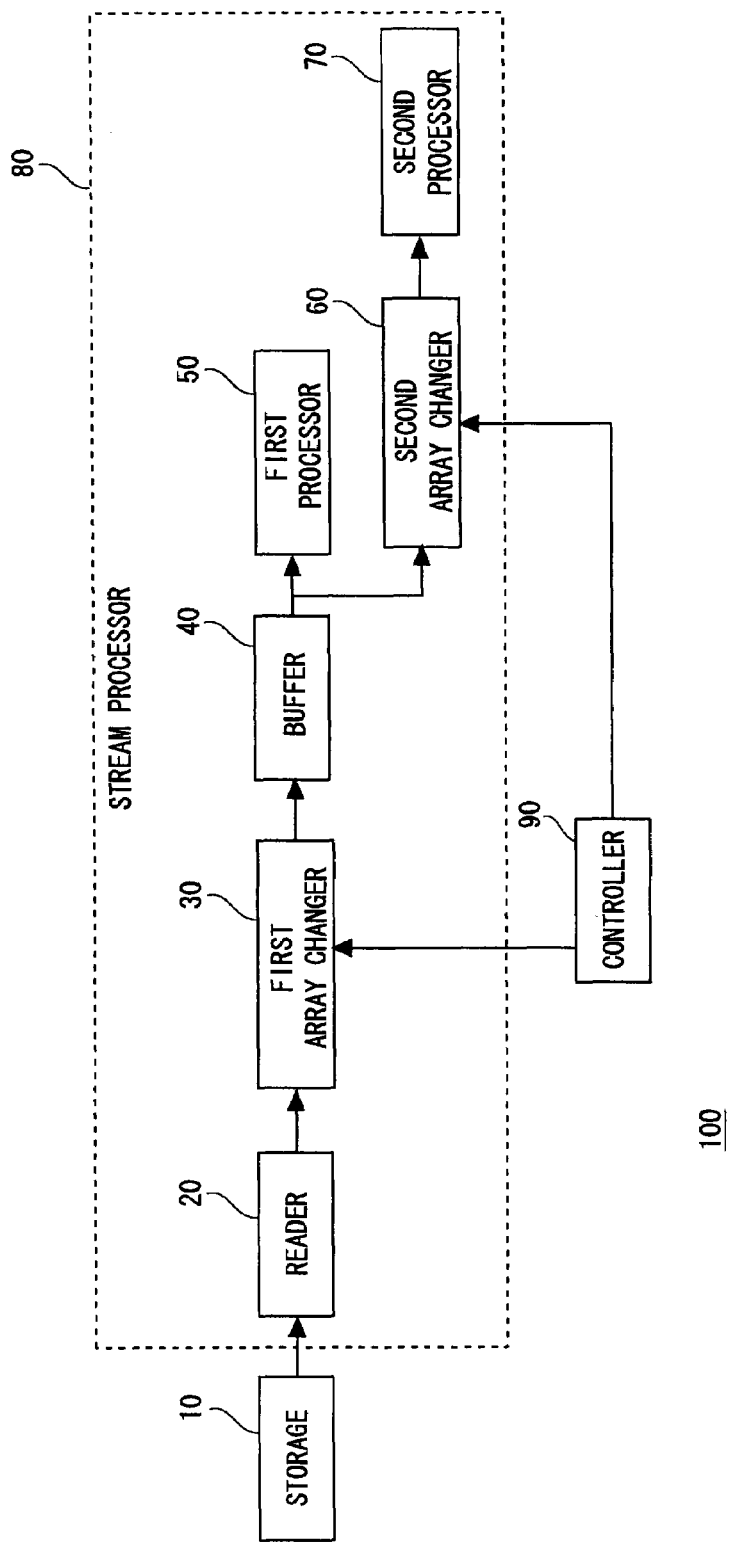
FIG. 1 is a block diagram showing a data processing system for explaining the principle of the present invention.

The data processing system 100 shown in FIG. 1 is an example of decoding encoded image data (the encoded image data is hereinafter referred to as a bit stream) and includes a storage 10, a stream processor 80 and a controller 90. The storage 10 stores bit streams, and the stream processor 80 decodes the bit streams stored in the storage 10. The controller 90 controls the stream processor 80.

Each of the components of the data processing system 100 illustrated in FIG. 1 as functional blocks for performing various processes may be configured as a processor, a memory and other LSIs as hardware. As software, they may be realized by programs loaded to the memory. Accordingly it is understood for those skilled in the art that the functional blocks can be realized only with hardware, software or a combination thereof, and not limited to any of them.

Figure 14:
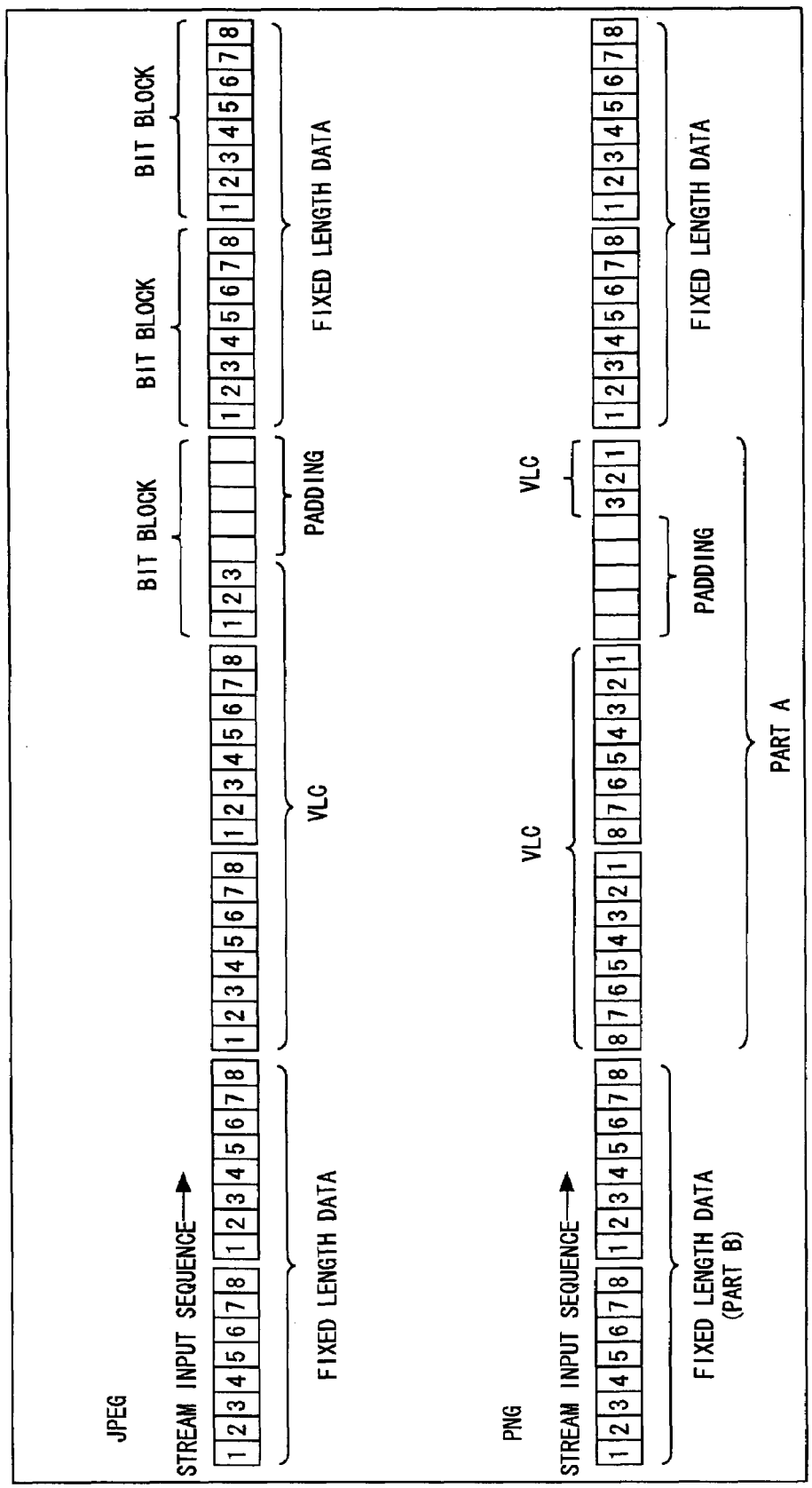
FIG. 14 is a view explaining a difference in bit array sequences of JPEG and PNG.

The stream processor 80 includes a reader 20, a first array changer 30, a buffer 40, a first processor 50, a second array changer 60 and a second processor 70. The data processing system 100 is able to support several types of bit streams in which a part of the bit array sequence is different. As an example, the bit streams having a VLC and fixed length data parts as in the JPEG and PNG bit streams of FIG. 14 are to be processed by the data processing system 100. Further, the two types of parts are processed each by the first processor 50 and the second processor 70. Hereinafter the part processed by the first processor 50 is referred to as a part A, and the part processed by the second processor 70 is referred to as a part B. Note that in the example shown in FIG. 14, the VLC part (including padding bits) is referred to as a part A, and the fixed length part is referred to as a part B.

The reader 20 reads out a bit stream from the storage 10 by each bit block included in the bit stream and outputs the bit blocks to the first array changer 30. For example, if the number of bits in the bit blocks is n bits, the bit block is read out by n bits each. Note that for JPEG and PNG bit streams, the number of bits in the bit blocks is 8, thus it is read out by 8 bits.

The first array changer 30 changes the array sequence of an n bits that are output from the reader 20 in reverse sequence (changing the array sequence in reverse sequence is hereinafter referred to as swap) according to the control by the controller 90 (details described later in detail) and outputs to the buffer 40 or outputs as it is.

The buffer 40 is FIFO (First In First Out), and data temporarily stored in the buffer 40 is output to the first processor 50, if the data is of part A, or to the second processor 70 via the second array changer 60, if the data is of part B, under the principle of first in first out.

The first processor 50 processes the part A of the bit stream. The second array changer 60 swaps n bits of the part B that are output from the buffer 40 according to the control by the controller 90 and then outputs to the second processor 70 or outputs as it is.

The second processor 70 processes the part B of the bit stream that is output from the second array changer 60.

The controller 90 is described hereinafter in detail. The controller 90 performs two types of controls. One is a control whether to change an array sequence of bits by the first array changer 30 and the second array changer 60. Another is a control of a shifter (not shown) that shifts the contents of the buffer 40 so that the beginning of the buffer 40 is to be the first of the bit block to be processed next.

As described in the foregoing, the data processing system 100 is able to support bit streams of several types with a part of bit array sequence being different. For these bit streams, the first processor 50 is used commonly to process the part A, and the second processor 70 is used commonly to process the part B. Accordingly it is required to align the bit array sequences of the part A and B in the bit stream to the order of process by the first processor 50 and the second processor 70. The controller 90 controls the first array changer 30 and the second array changer 60 depending on the type of bit stream to align the array sequence of bits.

Figure 2:
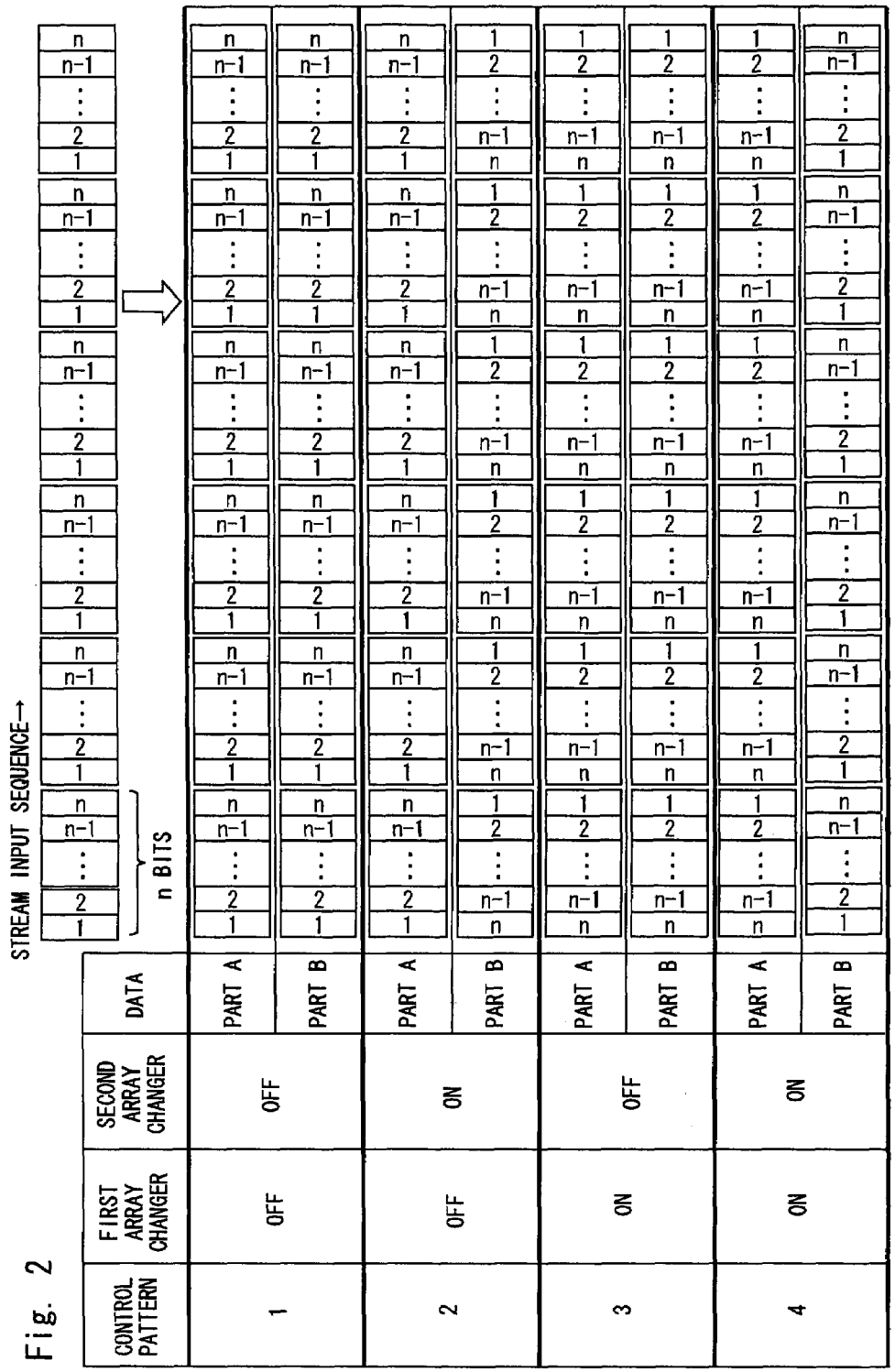
FIG. 2 is a view explaining an operation of a first and a second array changers in the data processing system of FIG. 1.

Referring to FIG. 2, 4 types of control patterns that the controller 90 could take and the changes of array sequences of the bit strings by each control pattern are described herein after in detail by the operations of the first array changer 30 and the second array changer 60. In FIG. 2, "ON" and "OFF" respectively refer to "change" and "no change".

The top part of FIG. 2 is the original array sequence of a stream stored in the storage 10. The bit stream is read out in the array sequence by the reader 20 and input to the first array changer 30. Further, after the bit stream is stored in the buffer 40, a part A is input to the first processor 50, and a part B is input to the second processor 70 via the second array changer 60.

The left column of FIG. 2 shows a control pattern, while the right column of FIG. 2 shows a state of an array of bits in the part A that are input to the first processor 50 and a state of an array of bits in the part B that are input to the second processor 70 by each control pattern.

In the control pattern 1 shown in FIG. 2, both of the first array changer 30 and the second array changer 60 do not perform a bit swapping. Accordingly the data (part A) that is input to the first processor 50 and the data (part B) that is input to the second processor 70 have the original array sequence of the bit string. This control pattern is able to support a bit stream in which bit array sequences of part A and B are same as the order of process respectively by the first processor 50 and the second processor 70.

In the control pattern 2 shown in FIG. 2, the first array changer 30 does not perform a bit swap, but the second array changer 60 performs a bit swap. Accordingly, while the bit array sequence of the data (part A) that is input to the first processor 50 remains as original, the bit array sequence of the data (part B) that is input to the second processor 70 has a reversed bit array sequence from the original sequence. The control pattern is able to support a bit stream in which a bit array sequence of a part A is the same as the order of process by the first processor 50, while a bit array sequence of a part B is opposite to the order of process by the second processor 70.

In the control pattern 3 shown in FIG. 2, the first array changer 30 performs a bit swap, but the second array changer 60 does not perform a bit swap. Accordingly both the bit array sequence of the data (part A) that is input to the first processor 50 and the bit array sequence of the data (part B) that is input to the second processor 70 have reversed bit array sequences from the original sequences. The control pattern is able to support a bit stream in which bit array sequences of part A and B are opposite to the orders of process by the first processor 50 and the second processor 70.

In the control pattern 4 shown in FIG. 2, both the first array changer 30 and the second array changer 60 perform a bit swap. Accordingly while the bit array sequence of the data (part A) that is input to the first processor 50 has a reversed bit array sequence from the original sequence, the bit array sequence of the data (part B) that is input to the second processor 70 remains as original. The control pattern is able to support a bit stream in which a bit array sequence of a part A opposite to the order of process by the first processor 50, while a bit array sequence of a part B is same as the order of process by the second processor 70.

As set forth above, with the data processing system 100 shown in FIG. 1, it is possible to process several types of bit streams with array sequence in part A or B being different by commonly using the first processor 50 and the second processor 70.

Here, a case of processing two types of bit streams (type 1 and type 2) having reversed bit array sequences of bit blocks in the part A, but same bit array sequences of the bit blocks in the part B is considered hereinafter. As an example, the first processor 50 and the second processor 70 are to process with the original bit array sequence of the bit blocks in the type 1 bit stream. In this case, if a bit stream is read out from the storage 10 to supply directly to the first processor 50 and the second processor 70, as the bit array sequence of the bit block in the part A of the type 2 bit stream is opposite to the order of process of the first processor 50, the array sequence needs to be adjusted when reading out. On the other hand, for the part B, the array sequence is not required to be adjusted. Accordingly even for the same bit streams, different controls are required to read out the parts A and B, thereby generating a latency in data supply caused by the switch of the controls.

On the other hand, according to the data processing system 100 shown in the drawings, by the combination of the first array changer 30 and the second array changer 60, the bit array sequences of the parts A and B are aligned to the order of sequence of the first processor 50 and the second processor 70. Thus to process one bit stream, by once setting the first array changer 30 and the second array changer 60 to be ON/OFF, it is not required to switch the controls for reading out the parts A and B by the reader 20. This achieves high-speed data supplies.

Further, when determining whether to read out data of the next processing unit (for example 8 bits) from the storage 10, the control for reading out is simple for the reader 20 because it only needs to refer whether there is a free space in the buffer 40 for one processing unit.

Figure 3:
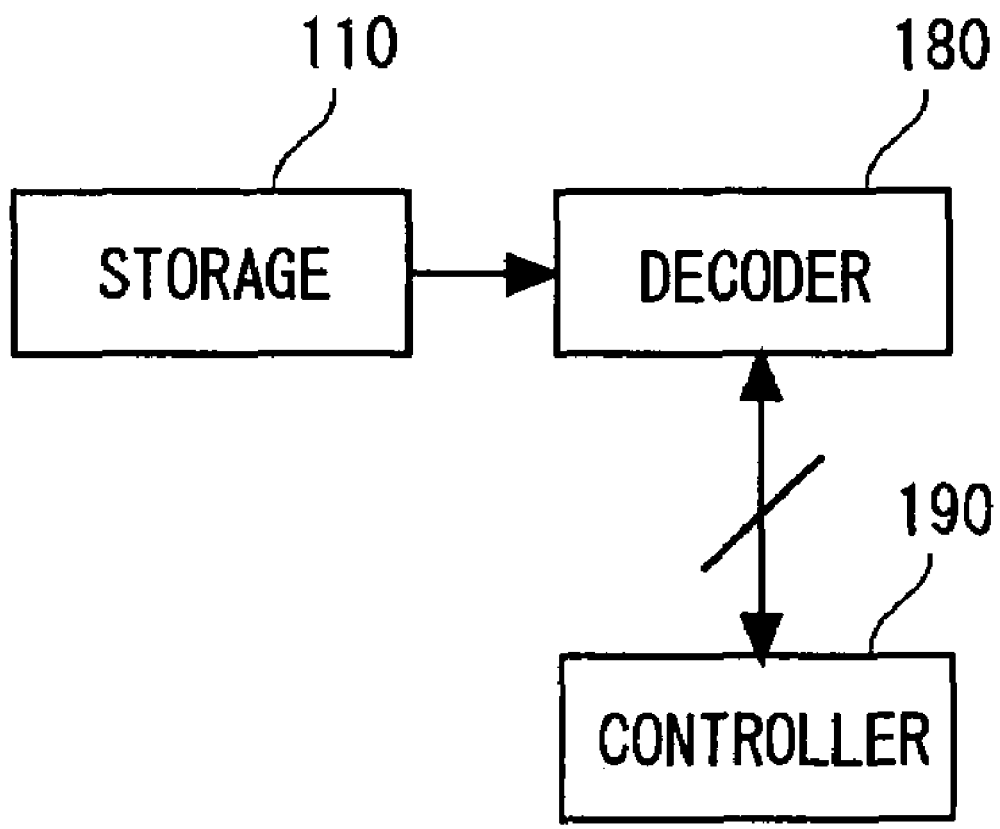
FIG. 3 is a block diagram showing a configuration of the data processing system according to an embodiment of the present invention.

Next, an embodiment achieving the above-mentioned principle of the present invention is described hereinafter in detail. FIG. 3 is a view showing a configuration of a data processing system 200 according to an embodiment of the present invention. The data processing system 200 includes a storage 110 for storing encoded image data, which is a bit stream, a decoder 180 for decoding the bit stream stored in the storage 110 and a controller 190 for controlling the decoder 180. As an example, data to be processed by the data processing system 200 is assumed to be the JPEG and PNG bit streams shown in FIG. 14.

Figure 4:
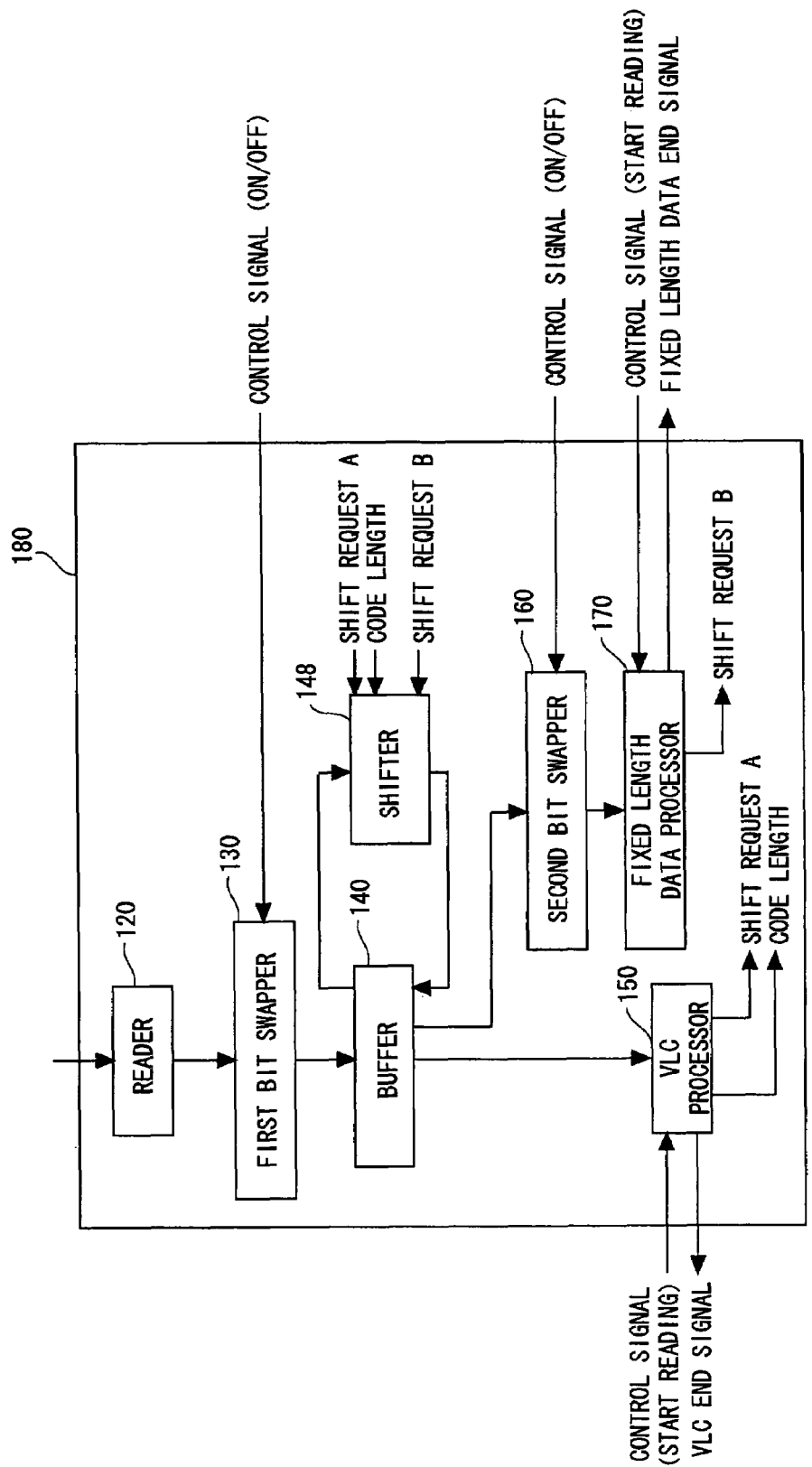
FIG. 4 is a view showing a configuration of a decoder in the data processing system of FIG. 3.

FIG. 4 is a view showing a configuration of the decoder 180. The decoder 180 includes a reader 120, a first bit swapper 130, a buffer 140, a shifter 148, a VLC processor 150, a second bit swapper 160 and a fixed length data processor 170. The reader 120 reads out a bit stream from the storage 110 by 8 bits each and outputs to the first bit swapper 130.

The first bit swapper 130 changes an array sequence of 8 bits data that is output to the reader 120 in reversed sequence according to a control by the controller 190 (details described later) and outputs to the buffer 140 or outputs as it is.

The buffer 140 is FIFO and is the same as the buffer 40 in the data processing system 100 shown in FIG. 1. Thus, the detailed description will not be repeated here.

The shifter 148 shifts the contents of the buffer 140 so that the beginning of the storage region of the buffer 140 to be the first of the data to be processed next, and this operation is performed according to a shift request A and a code length from the VLC processor 150 and a shift request B (details described later) from the fixed length data processor 170.

The VLC processor 150 corresponds to the first processor 50 in the data processing system 100 shown in FIG. 1 and decodes a VLC part in a bit stream.

The second bit swapper 160 changes an array sequence of 8 bits of the fixed length data part that is output from the buffer 140 in reversed sequence and outputs to the fixed length data processor 170.

The fixed length data processor 170 corresponds to the second processor 70 in the data processing system 100 shown in FIG. 1 and decodes a fixed length data part that is output from the second bit swapper 160.

As described in the foregoing, in JPEG and PNG bit streams, bit array sequences of fixed length data parts are the same, however, bit array sequences of VLC parts are opposite to each other. In this embodiment, a JPEG bit stream is to be processed by default. The VLC processor 150 and the fixed length data processor 170 processes the bit array sequences of the data in VLC parts and the bit array sequences of the fixed length data parts of JPEG.

In FIG. 4, the control signal of "ON" or "OFF" that is received by the first bit swapper 130 and the second bit swapper 160 and a control signal indicating "readout start" that is received by the VLC processor 150 and the fixed length data processor 170 are issued by the controller 190. The controller 190 controls whether to perform a bit swap by sending the control signal to the first bit swapper 130 and the second bit swapper 160, and directs to start reading out data from the buffer 140 by sending the control signal to the VLC processor 150 and the fixed length data processor 170.

Figure 5:
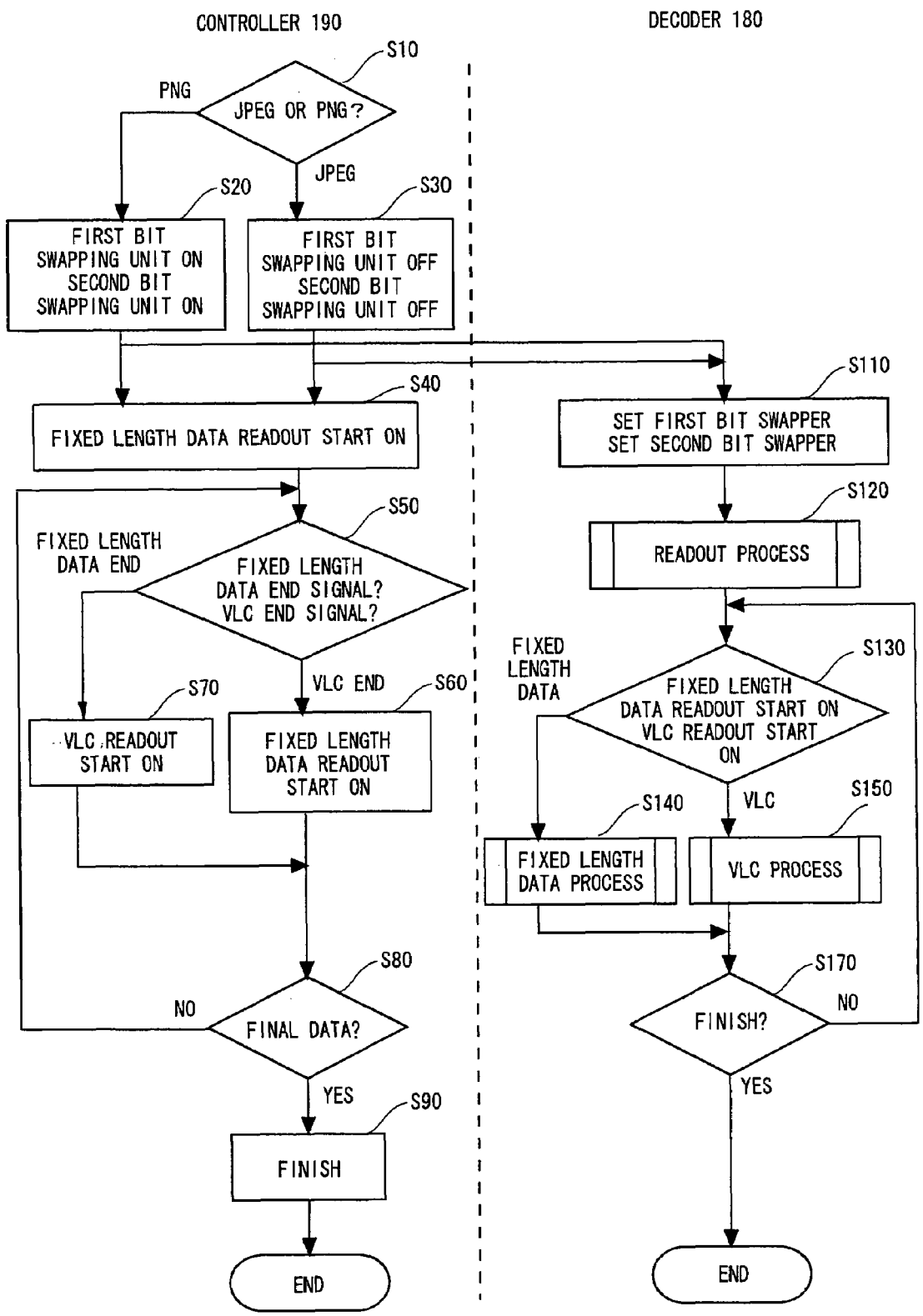
FIG. 5 is a flowchart illustrating the process of a controller and a decoder in the data processing system of FIG. 3.

An operation of each functional blocks included in the data processing system 200 is described hereinafter in detail. FIG. 5 is a flowchart illustrating a process flow by the decoder 180 and the controller 190 in the data processing system 200. The flow on the left is the process flow of the controller 190, while the flow on the right is the process flow of the decoder 180.

The controller 190 firstly controls the first bit swapper 130 and the second bit swapper 160 to be ON or OFF according to the type of a bit stream to be processed that is stored in the storage 110. Specifically, if the bit stream to be processed is a JPEG bit stream (S10:JPEG), a control signal is sent to set the first bit swapper 130 and the second bit swapper 160 to be both "OFF" (S30).

This sets the first bit swapper. 130 and the second bit swapper 160 to be "OFF", where both swappers do not perform a bit swapping (S110).

On the other hand if the bit stream to be processed is a PNG bit stream (S10:PNG), the controller 190 sends a control signal to set the first bit swapper 130 and the second bit swapper 160 to be both "ON" (S20). This sets the first bit swapper 130 and the second bit swapper 160 to be "ON", where both swappers perform a bit swapping (S110).

Then the controller 190 sends a "readout start ON"signal to the fixed length data processor 170 to direct to start reading out fixed length data that is at the beginning of a bit stream (details described later) stored in the buffer 140 (S40). After that, upon a reception of a signal indicating an end of fixed length data (hereinafter referred to as a fixed length data end signal) from the fixed length data processor 170, the controller 190 sends a "readout start ON" signal to the VLC processor 150 to direct to start reading out VLC from the buffer 140 (S50: fixed length data end signal and S70) On the other hand, on a reception of a signal indicating an end of VLC (hereinafter referred to as a VLC end signal) from the VLC processor 150, the controller 190 repeats a process to send the "readout start ON" signal to the fixed length data processor 170 (S50: VLC end signal and S60).

Note that when the encoder 180 finishes processing one bit stream (S80: Yes), the controller 190 finishes the process of the data processing system 200 (S90). Here, an evaluation of the process termination in step S90 is performed by the VLC processor 150 of the decoder 180. The details are described later.

In order to decode the bit stream stored in the storage 110, the decoder 180 firstly reads out from the beginning of the bit stream in order by 8 bits sequentially from the storage 110 and outputs to the first bit swapper 130 (S120).

The data read out by the reader 120 is temporary stored in the buffer 140 via the first bit swapper 130, and sequentially processed by the VLC processor 140 or the fixed length data processor 170 (S130 to S150). On the reception of the "readout ON" signal from the controller 190, the fixed length data processor 170 read out fixed length data from the buffer 140 (S130:fixed length data and S140) to decode. On the reception of the "readout ON" signal from the controller 190, the VLC processor 150 reads out VLC from the buffer 140 to decode (S130: VLC and S150). These processes are repeated until terminated by the controller 190 (S170).

Figure 6:
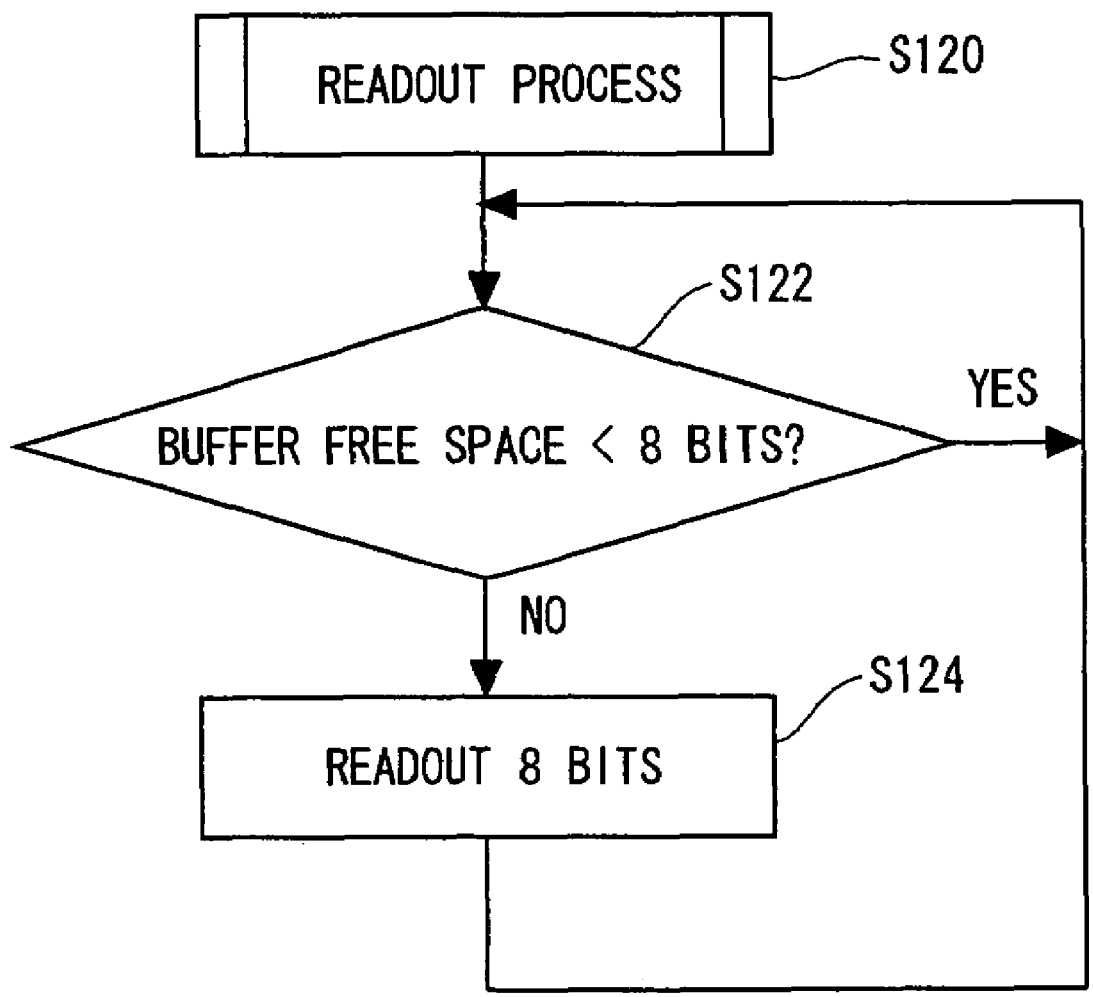
FIG. 6 is a flowchart illustrating the process of a reader in the decoder of FIG. 4.

FIG. 6 is a flowchart illustrating details of the readout process by the reader 120 in step S120. Depending on whether the free space in the buffer 140 is more than or equal to 8 bits, if the free space is more than or equal to 8 bits, the reader 120 reads outs 8 bits from the storage 110, stores to the buffer 140 via the first bit swapper 130 (S122;No and S124). If the free space is less than 8 bits, the reader 120 stops reading out from the storage 110 until the free space in the buffer 140 becomes more than equal to 8 bits (S122:Yes).

The processes of the VLC processor 150, second bit swapper 160, fixed length data processor 170 and shifter 148 are described hereinafter in detail with an example where a PNG bit stream is to be processed. In this case, as the PNG bit stream is to be processed, the first bit swapper 130 and second bit swapper 160 are set to be "ON", specifically to perform a swapping.

Figure 7:
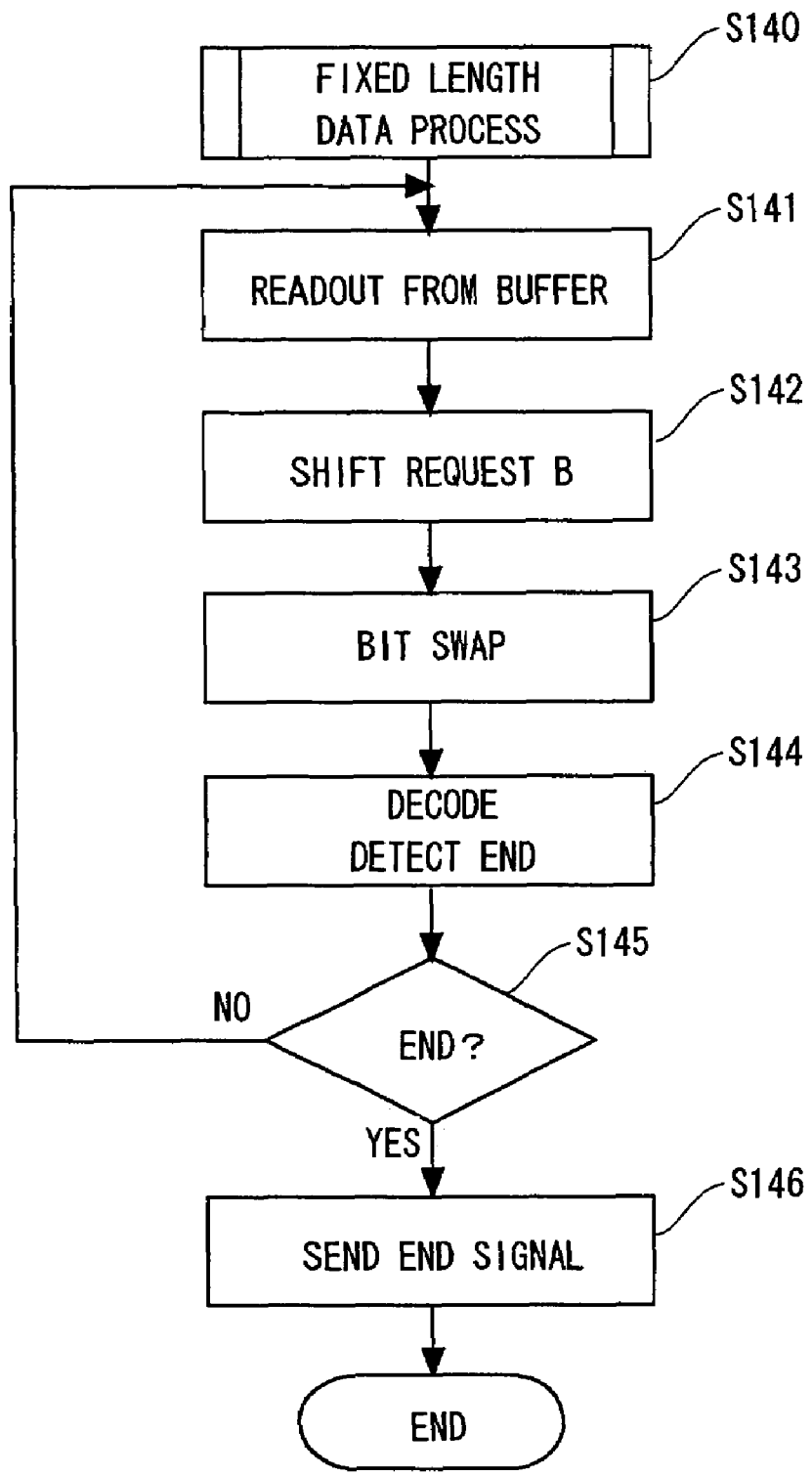
FIG. 7 is a flowchart illustrating the process for the part of fixed length data.

FIG. 7 is a flowchart illustrating the fixed length data process (S140) of FIG. 5. On the reception of a signal indicating a readout start from the controller 190, the fixed length data processor 170 start reading out the beginning 8 bits data from the buffer 140 (S141).

Figure 9:
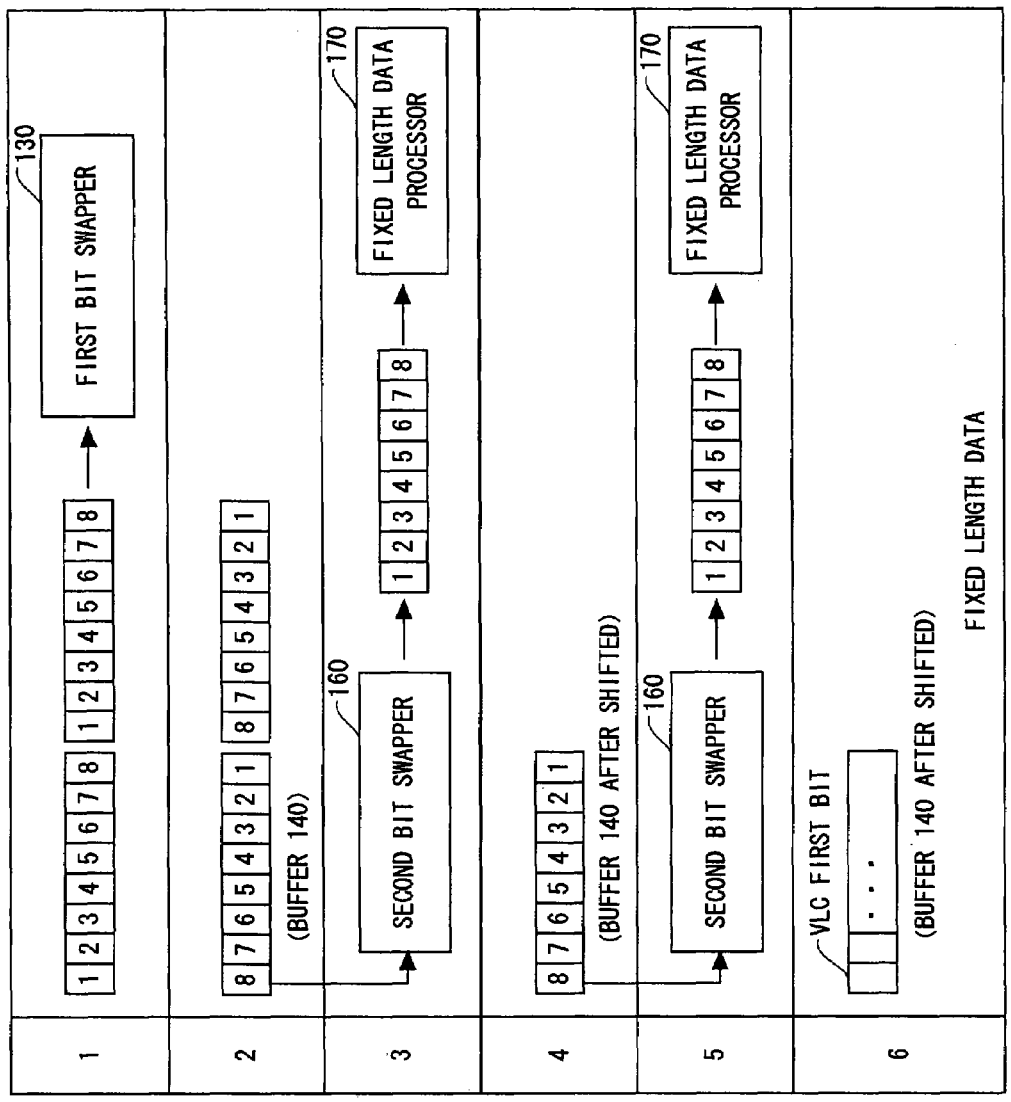
FIG. 9 is a view explaining the process to be performed for fixed length data.

As shown in the columns 1 and 2 of FIG. 9, in this case, the array sequence of the fixed length data read out from the reader 120 is swapped by 8 bits each and stored in the buffer 140 having a reversed array sequence from the array sequence when stored in the storage 110.

The fixed length data processor 170 reads out 8 bits fixed length data from the buffer 140 and also issues a shift request (hereinafter referred to as a shift request B to differentiate from the shift request from the VLC processor 150) when finished reading out (S142).

Here the 8 bits fixed length data that is read out from the buffer 140 by the fixed length data processor 170 is input to the second bit swapper 160. The second bit swapper 160 changes the array sequence of the 8 bits data (S143). As shown in the column 3 of FIG. 9, the array sequence of the 8 bits fixed length data that is read out from the buffer 140 by the second bit swapper 160 is reversed, specifically the array sequence is returned to the array sequence of when stored in the storage 110.

The fixed length data processor 170 decodes the 8 bits fixed length data that the second bit swapper 160 has performed a bit swap (S144).

Although not shown in FIG. 7, on the reception of the shift request B, the shifter 148 shifts the contents of the buffer 140 by 8 bits toward the beginning of the buffer 140. By doing this, the beginning of the next 8 bits after the 8 bits that are already read out by the fixed length data processor 170 come at the beginning of the buffer 140 (column 4 of FIG. 9).

The fixed data length processor 170 decodes 8 bits whose array sequence is returned to the original by the second bit swapper 160 and also detects whether the last bit of the 8 bits in process is an end of the fixed length data (S144). Here the "end of fixed length data" indicates a boundary A between the fixed length data and VLC that follows.

If the last bit of the decoded fixed length data is not the boundary A (S145: No), the fixed length data processor 170 repeats the process of reading out 8 bits from the buffer 140 (and sending the shift request B) and decoding the readout 8 bits after a bit swap has performed by the second bit swapper 160 (including detection of the boundary A) (S141 to S144). On the other hand, if the last bit of the decoded 8 bits fixed length data is the boundary A (S145:Yes), the fixed length data processor 170 sends the fixed length data end signal to the controller 190 (S146) to end the process.

At this time, due to the shift operation by the shifter 148, the beginning bit of the buffer 140 becomes the first bit of VLC that follows the fixed length data processed by the fixed length data processor 170 (see column 6 of FIG. 9).

Figure 10:
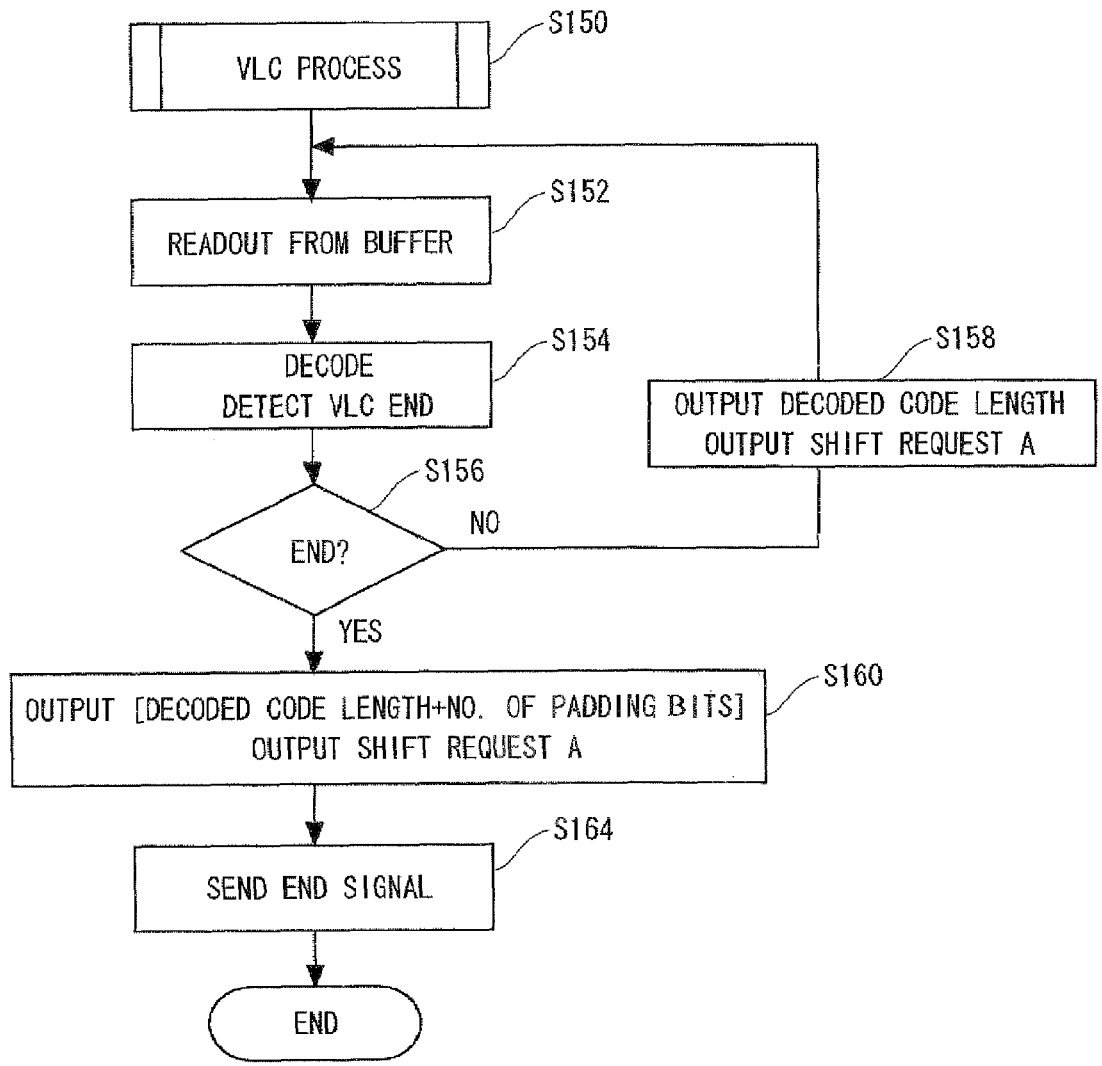
FIG. 10 is a flowchart illustrating the process for a VLC part.

As set forth above, on the reception of the fixed length data end signal from the fixed length data processor 170, the controller 190 sends a signal to direct the VLC processor 150 to start reading out. FIG. 10 is a flowchart illustrating the process after the VLC processor 150 receives this signal.

On the reception of the signal indicating a readout start from the controller 190, the VLC processor 150 reads out data of predetermined number of bits from the beginning of the buffer 140 (S152). The number of bits read by the VLC processor 150 at one time may be any depending on the design. In this case, it is assumed to be 10 bits.

As set forth above, the bit array sequence of the VLC part of PNG is opposite to the bit array sequence of the VLC part of JPEG. As shown in the columns 1 and 2 of FIG. 11, in this case, the array sequence of data of the VLC part read out from the reader 120 is swapped by 8 bits each and stored in the buffer 140 with the reversed array sequence from the array sequence when stored in the storage 110. Specifically, the bit array sequence of the VLC part stored in the buffer 140 is same as the bit array sequence of the VLC part of JPEG. In the example shown in FIG. 11, the VLC part has 10 bits valid data and 5 bits padding bits to align the 8 bits boundary of the stream to the last 8 bits of the block.

Figure 8:
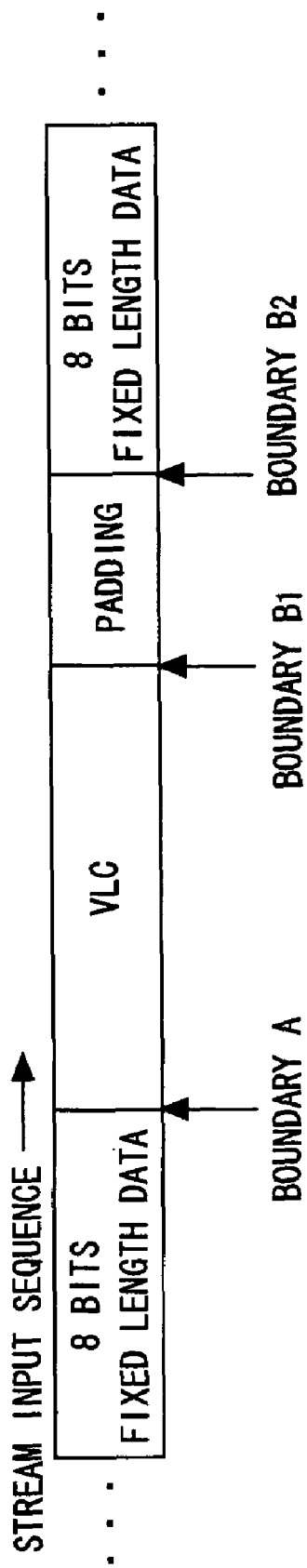
FIG. 8 is a view showing a boundary between data blocks.

The VLC processor 150 reads out 10 bits data from the buffer 140 (S152), decodes the 10 bits data and also detects whether there is an end bit of VLC (S154). As shown in FIG. 8, an end of VLC indicates a boundary B1 between a valid bit of VLC and a padding bit.

If the VLC end is not detected in 10 bits in process (S156: No), the VLC processor 150 outputs the decoded code length (10 bits in this case) along with the shift request A to the shifter 148 (S158). Although not shown in FIG. 10, on the reception of the shift request A from the VLC processor 150, the shifter 148 shifts the contents of the buffer 140 by the code length that is output along with the shift request A towards the beginning. This makes the beginning of the data following the 10 bits that is already read out by the VLC processor 150 to be positioned at the beginning of the buffer 140 (see column 4 of FIG. 11.

Figure 11:
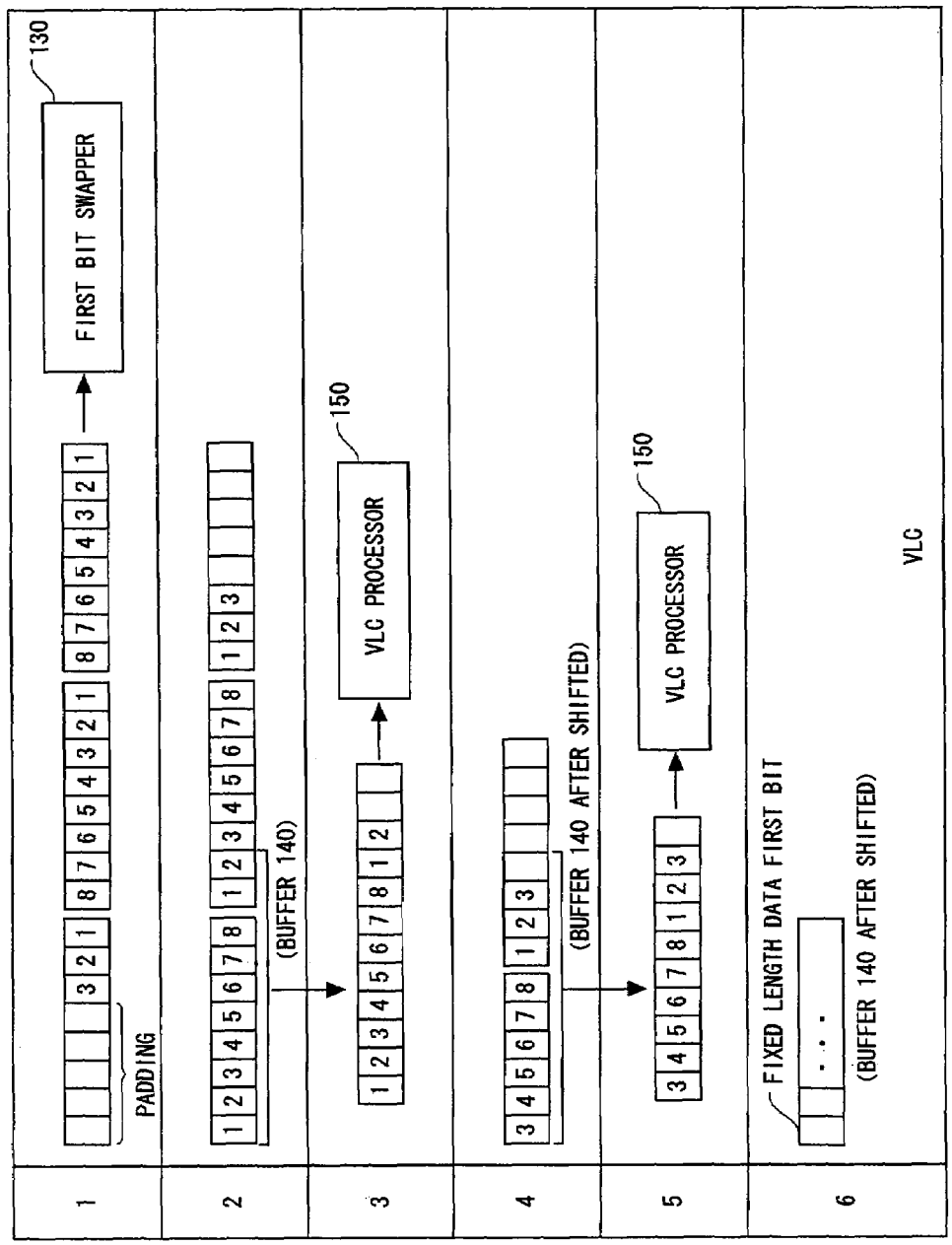
FIG. 11 is a view explaining the process to be performed for VLC.

In this case, the VLC processor 150 reads out further 10 bits from the buffer 140 as shown in the column 5 of FIG. 11 to decode and detects the boundary B1 (S152 to S154).

On the other hand, when the VLC processor 150 detects the boundary B1 while decoding (S156:Yes), the VLC processor 150 outputs the sum of the code length that is decoded when the boundary B1 is detected and the number of padding bits as a code length to shift along with the shift request A to the shifter 148. Further, the VLC end signal is sent to the controller 190 (S164) to end the process.

At this time, due to the shift operation by the shifter 148, the padding bit is removed, and the first bit in the buffer 140 becomes the first bit of the fixed length data that follows VLC processed by the VLC processor 150 (see the column 6 of FIG. 11).

As set forth above, the process by the fixed length data processor 170 and the VLC processor 150 is repeated to bit streams until the bit streams ends. Here, the detection of the end of the bit stream may be performed as follows, for example. A counter is provided in the VLC processor 150 to count the number of pixels encoded by the VLC processor 150. At the time the number of counted pixels reaches the number of pixels forming one frame, a stream is to end. Further, when the VLC processor 150 detects the end of the stream, it sends a signal indicating the end to the controller 190. On the reception of the signal, the controller 190 controls the process of the data process system 200 to finish (S80:Yes and S90 in FIG. 5).

In the explanation above, the operation of the shifter 148 is described when explaining the process by the VLC processor 150 and the fixed length data processor 170. Here the operations by the shifter 148 are collectively explained.

Figure 12:
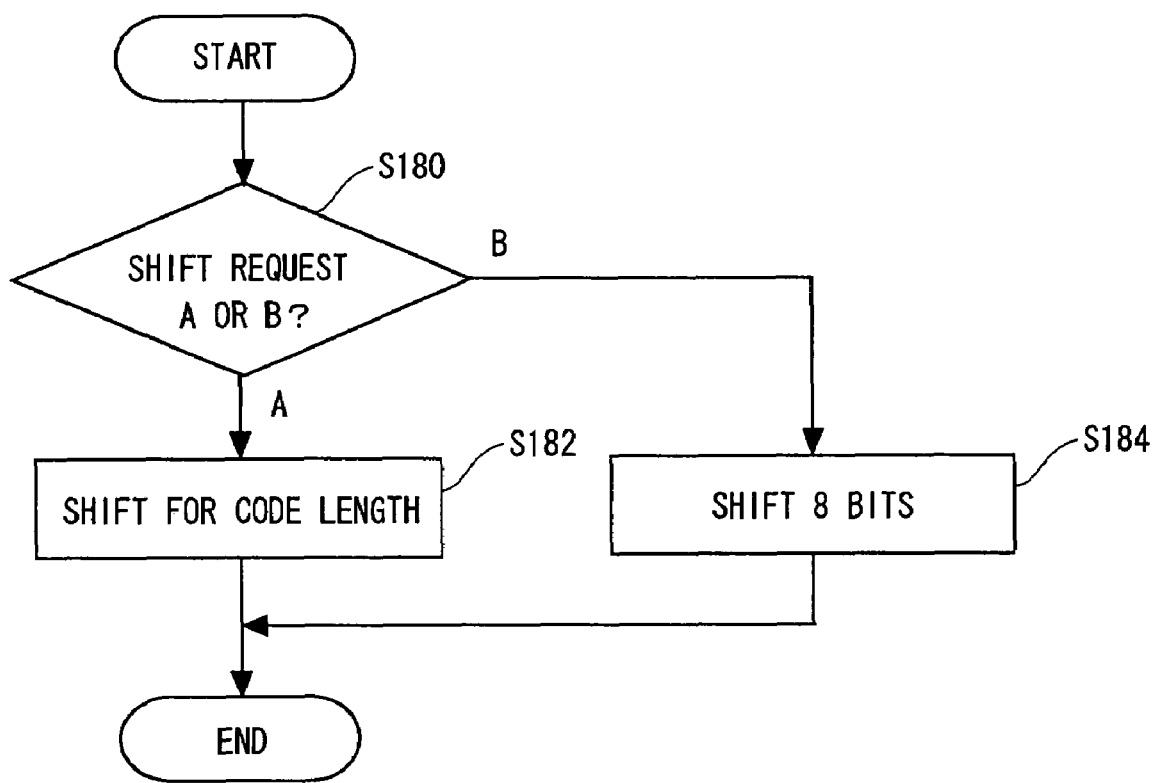
FIG. 12 is a flowchart illustrating the process of the shifter in the decoder of FIG. 4.
Figure 13:
FIG. 13 is a view showing a format of JPEG.

FIG. 12 is a flowchart illustrating the process of the shifter 148. On the reception of the shift request B from the fixed length data processor 170 (S180:B), the shifter 148 shifts the contents of the buffer 140 by 8 bits (S184) On the other hand, on the reception of the shift request A from the VLC processor 150 (S180:A), the shifter 148 shifts the contents of the buffer 140 by the code length sent along with the shift request A (S182).

The process for PNG bit streams is described in the foregoing. For JPEG bit streams, as the first bit swapper 130 and the second bit swapper 160 are set to "OFF", specifically not to perform a bit swap, each functional block processes in a bit array sequence of a JPEG bit stream. Excluding this point, the process is same as the process in case of a PNG bit stream, thus the detailed description is not repeated here.

As set forth above, according to the data processing system 200 of this embodiment, JPEG and PNG bit streams can be processed using the common VLC processor 150. Further, the first bit swapper 130 changes the bit array of VLC in the PNG bit stream in reversed sequence, thus reading out of the VLC from the buffer 140 may be performed according to FIFO, and thus it is simple.

Further in a similar manner, as the second bit swapper 160 further swaps the bit array of the fixed length data in the PNG bit stream that the first bit swapper 130 has performed a bit swap to return the bit array to the original, reading out of the fixed length data from the buffer 140 may be performed according to FIFO, and thus it is simple.

Further, by once setting the first bit swapper 130 and the second bit swapper 160 depending on PNG or JPEG, it is not required to set two bit swaps regardless of whether VLC or fixed length data while processing the corresponding bit stream later on. Accordingly, it is possible to read out data in the buffer 140 by the reader 120 without waiting for the detection result of an end of VLC. This achieves high-speed data supply.

It is apparent that the present invention is not limited to the above embodiment and it may be modified and changed without departing from the scope and spirit of the invention.

What is claimed is:

1. A data processor comprising:
    a first array changer that changes an array sequence of bits in reverse sequence for each bit block for a bit stream, the bit stream having a plurality of the bit blocks;
    a buffer to temporarily store bit blocks with bit array sequence changed by the first array changer;
    a first processor to read bits included in bit blocks to be processed by the first processor by each number of bits, a predetermined processing unit, in an array sequence of the buffer;
    a second processor to process bit blocks different from bit blocks processed by the first processor;
    a second array changer to read bits included in bit blocks to be processed by the second processor in the array sequence of the buffer and change an array sequence of bits included therein in reverse sequence to supply to the second processor; and
    a controller to control whether to change an array sequence of bits by the first and the second array changers according to a type of a bit stream, the array sequence of bits in a bit block being different depending on the type,
    wherein
    the first processor is to process a bit block including a variable length data part in the bit stream,
    the second processor is to process a bit block including a fixed length data part in the bit stream, and
    between two types of bit streams having a same array sequence of bits in a bit block including the fixed length data part but with different array sequences of bits in a bit block including the variable length data part, for one type of the bit stream, the controller controls the first and the second array changers not to change the array sequence, but for another type of the bit stream, the controller controls the first and the second array changers to change the array sequence.

2. The data processor according to claim 1, wherein the two types of bit streams are JPEG and PNG bit streams.

3. The data processor according to claim 2, wherein the controller controls not to change an array sequence of a JPEG bit stream by the first and the second array changers, while the controller controls to change an array sequence of a PNG bit stream by the first and the second array changers.

4. A method of data processing comprising:
    performing a first array changing process to change an array sequence of bits in reverse sequence for each bit block of a bit stream, the bit stream having a plurality of the bit blocks;
    temporarily storing the bit blocks with bit array sequence being changed by the first array changing process in a buffer;
    reading bits included in a particular bit block among the bit blocks by each number of bits, a predetermined processing unit, in an array sequence of the buffer;
    reading bits included in a bit block in the array sequence of the buffer, the bit block being different from the particular bit block;
    performing a second array changing process to change an array sequence of bits in the read out bit block in reverse sequence;

processing the bit block with the array sequence of bits being changed by the second array changing process; and controlling whether to perform the first array changing process or the second array changing process according to a type of a bit stream, the array sequence of bits in the bit blocks being different depending on the type, wherein the particular bit block includes a variable length data part in the bit stream, a bit block that is different from the particular bit block includes a fixed length data part in the bit stream, and between two types of bit streams having a same array sequence of bits in a bit block including the fixed length data part but with different array sequences of bits in a bit block including the variable length data part, for one type of the bit stream, the controller controls not to perform the first and the second array changing processes, but for another type of the bit stream, the controller controls to perform the first and the second array changing processes.

5. The method according to claim 4, wherein the two types of bit streams are JPEG and PNG bit streams.

6. The method according to claim 5, wherein the controller controls not to change an array sequence of a JPEG bit stream by the first and the second array changing processes, while the controller controls to change an array sequence of a PNG bit stream by the first and the second array changing processes.

7. A data processor for processing bit streams having a same array sequence of bits in bit blocks having a fixed length but with different array sequences of bits in bit blocks having a variable length, the data processor comprising:

a first array changer changing an array sequence of bits in reverse sequence for each bit block in a bit stream;

a second array changer that receives bit blocks from the first array changer and changes an array sequence of bits included therein in reverse sequence;

first and second processors that process bit blocks, the second processor processing bit blocks different from the bit blocks processed by the first processor, wherein the first processor receives an output from the first array changer and processes bit blocks having a variable length and the second processor receives an output from the second array changer and processes bit blocks having a fixed length; and a controller that controls whether to change an array sequence of bits by the first and the second array changers according to a type of bit stream, the array sequence of bits in a bit block being different depending on the type of bit stream, wherein the controller controls the first and the second array changers not to change the array sequence for one type of bit stream and controls the first and the second array changers to change the array sequence for another type of bit stream.

8. The data processor according to claim 7, wherein the types of bit streams are JPEG and PNG bit streams.

9. The data processor according to claim 8, wherein the controller does not change an array sequence of a JPEG bit stream with the first and the second array changers, and the controller changes an array sequence of a PNG bit stream with the first and the second array changers.

* * * * *